United States Patent [19]

Staten

[11] Patent Number: 4,490,474
[45] Date of Patent: Dec. 25, 1984

[54] FUSED CAST HIGH CHROME REFRACTORY AND METHOD FOR MANUFACTURING SAME

[75] Inventor: Walter T. Staten, Port Arthur, Tex.

[73] Assignee: Kennecott Corporation, Cleveland, Ohio

[21] Appl. No.: 503,540

[22] Filed: Jun. 13, 1983

[51] Int. Cl.³ .................. C04B 35/04; C04B 35/12
[52] U.S. Cl. .................................. 501/115; 501/112; 501/117
[58] Field of Search .................. 501/115, 117, 112

[56] References Cited

U.S. PATENT DOCUMENTS 2,279,260 4/1942 Benner et al. .................. 501/115
2,408,305 9/1946 Field .................................. 501/115
3,759,728 9/1973 Miller et al. .................... 501/115
4,158,569 6/1979 Brothers et al. ................ 501/117

*Primary Examiner*—Mark Bell
*Attorney, Agent, or Firm*—David M. Ronyak; Michael L. Dunn

[57] ABSTRACT

A fused cast ceramic composition having superior corrosion and stoning resistance in the presence of E glass when compared with prior art compositions having comparable chromia content. The composition is a solidified fusion of from about 65 to about 98 weight percent $Cr_2O_3$, from about 0.75 to about 4 weight percent MgO and from about 1 to about 34.25 weight percent alumina. The invention also comprises the method for manufacturing the composition by fusing the appropriate materials at the required concentrations.

9 Claims, No Drawings

FUSED CAST HIGH CHROME REFRACTORY AND METHOD FOR MANUFACTURING SAME

BACKGROUND ART

This invention relates to fused cast refractories and more particularly relates to such refractories which are used for glass manufacture and particularly in the manufacture of alkaline earth borosilicate glass known as "E" glass which is used extensively in the production of glass fibers.

Fused cast refractories have been known and used for many years. Such refractories have presented many advantages in certain uses over the older type of refractory products which comprise granular heat-resistant materials bonded in desired shapes with other heat-resistant ceramic materials. Some fused cast refractories resisted attack by corrosive melts such as glass and molten metal oxides. Such corrosion resistance was not, however, as good as desired.

Many different compositions for fused cast refractories have been previously suggested. Such fused cast refractories are, for example, suggested in U.S. Pat. Nos. 2,063,154; 2,279,260; 2,911,313; 3,188,219; 3,232,776; 3,759,728; 3,773,531 and 4,158,569.

Unfortunately, such fused cast refractories of the prior art, even when they contained chromia ($Cr_2O_3$) in amounts in excess of 65 weight percent, were subjected to unacceptable corrosion and stoning effects from certain corrosive glasses such as "E" glass as previously described.

Even when attempts were specifically made to reduce such corrosion and stoning by increasing chromia content, as described in U.S. Pat. No. 3,759,728, corrosion resistance was not as high as desired.

Some success was obtained when certain sintered ceramics were used in contact with corrosive melts such as "E" glass; however, even sintered compositions were not as good as desired and furthermore the manufacture of acceptable sinters is difficult and costly. In addition, sinters generally have an undesirably high porosity.

DESCRIPTION OF THE INVENTION

In accordance with the present invention, there is provided a fused ceramic compositon which has a combination of corrosion and stoning resistance in the presence of molten ceramic glasses such as "E" glass which is superior to prior art fused ceramic compositions at comparable chromia content. In general, either the corrosion resistance or stoning resistance is superior to prior art compositions at comparable chromia content; and the remaining stoning or corrosion characteristic is comparable to and usually better than such prior art compositions.

In accordance with the present invention, it has been discovered that a particular composition comprising chromia, magnesia and alumina will provide such corrosion resistance. The fused ceramic composition, in accordance with the invention, comprises a fusion of from about 65 to about 98 weight percent chromia ($Cr_2O_3$), from about 0.75 to about 4 weight percent magnesia (MgO) and from about 1 to about 34.25 weight percent alumina ($Al_2O_3$). Preferably, the composition comprises a fusion of from about 68 to about 90 weight percent $Cr_2O_3$, from about 0.75 to about 2.5 weight percent MgO and from about 9 to about 31.25 weight percent $Al_2O_3$.

The invention further comprises the method for the manufacture of the solidified fused ceramic composition as previously described.

In general, such fusions take place in a high temperature furnace which is usually an arc furnace.

After a mixture of the chromia, magnesia and alumina is melted or fused, the molten composition is generally poured into a mold and slowly cooled until it is solidified and is near ambient temperature. Usually such slow cooling occurs at the rate of from about 10° C. to about 50° C. per hour. The sources of the chromia, magnesia and alumina should be relatively free from calcia (CaO), alkali metal oxides such as sodium and potassium oxide and excessive amounts of iron in the form of free metal or oxide.

Naturally occurring minerals may be used for the sources of the chromia, magnesia and alumina, provided that the above detrimental substances be reduced and removed to the point where they cause little effect upon the stoning, corrosion or shock resistance of the finished product. As previously discussed, desirably the chromia, magnesia and alumina are essentially pure compounds; however, naturally occurring minerals containing these compounds may be used provided that they don't contain detrimental quantities of the above described impurities. The principal source for chromia is the mineral chromite. Chromite usually contains at least some iron which is desirably removed prior to its use in accordance with the present invention. Most of such iron can be removed by reduction from the mineral followed by removal of the freed iron.

The principal source for alumina is bauxite. The bauxite is usually reduced to remove iron. Soda ($Na_2O$) is also usually removed. The quantity of iron and soda is removed to a level which is not detrimental to the fused cast product in accordance with the present invention.

Often, sufficient magnesia can be obtained directly from the alumina or chromia containing substituents of the fusion. If insufficient magnesia is provided this way, additional magnesia can be added either in pure form or in the form of magnesia ores which upon treatment results in relatively high purity magnesium oxides.

Usually less than 1 percent by weight and preferably less than about 0.5 percent by weight of alkali metal oxides are present by weight of total mixture of the components to be fused and usually less than about 6 percent by weight and preferably less than about 2 percent by weight of iron oxide is present by weight of total mixture to be fused. Desirably, less than about 1 percent calcia is present by weight of the mixture.

Other impurities present in the mixture should be refractory in nature and should generally not be readily subject to corrosion by "E" glass as previously described. Up to about 3 percent silica ($SiO_2$) is permissible but usually less than about 2.5 percent is desirable. In any case, the total impurities within the mixture must be below an amount which would prevent the required percentages of alumina, chromia and magnesia to be present within the composition as previously described. Usually, less than about 10 percent and preferably less than about 8 percent and most preferably less than about 5 percent by weight of the total mixture of components other than chromia, magnesia and alumina is present. Such impurities, however, are not intended to include purposely added fluxes or fusion aids. The fusions made in accordance with the present invention in fact usually incorporate a flow additive, flux, oxidizer or other fusion additive herein collectively referred to as fusion aids. Examples of such fusion aids are silicon dioxide, oxidizers such as sodium or potassium nitrate and compounds containing lithium, fluorine or mixtures thereof such as lithium oxide, lithium carbonate, aluminum fluoride, calcium fluoride, lithium fluoride and minerals containing either one or both of lithium and fluorine. Usually from about 1 to about 4 weight percent of fusion aids is present.

The making of fused cast refractories is well known in the art. Briefly, the raw materials, usually after thorough mixing and blending, are fused in an open top pot-type arc furnace similar to that used in the production of synthetic alumina abrasives.

In carrying out the fusion, the furnace generally consists of a water-cooled iron shell, having no other lining than that built up by the material being fused as it is fed into the furnace. Fusion is effected initially by the heat from a carbon train between two or more carbon or graphite electrodes inserted in the iron shell. After a bath of molten material is formed, the molten material, rather than the carbon train, provides most of the resistance to the electric current to supply heat to the system.

The mixture of the material may either be gradually fed into the furnace or may be added in bulk. When the material is gradually fed in, the electrodes are usually raised as the fusion mass is built up.

When the material has arrived at the proper temperature and the correct degree of fluidity, it is poured into molds of the desired shape and size. The melt temperature for the composition, in accordance with the present invention, is usually between about 2,100° and 2,150° C. The mold is usually a shape formed in bonded aluminum oxide, graphite or other high temperature material.

After molding, the fusion is slowly cooled. The time-temperature curve required to obtain the desired results varies with the shape and size of the molded pieces and also with the exact composition of the material being cast. In general, it may be said that if a given rate produces cracking, it is obviously desirable to further retard the cooling rate over some or all of the cooling range. Cooling rate can readily be determined by those skilled in the art. Methods for cooling known to those skilled in the art can readily be used. For example, the molded pieces may be left in the mold for cooling or the pieces may be taken from the molds shortly after the outer walls of the casting have solidified and then annealed under their own support. For annealing, any of customary annealing practices such as placing the molded pieces in a furnace and gradually reducing the temperature may be utilized. Cooling may also be accomplished by covering the pieces with hot sand or other insulating material or heavily insulating the pieces and allowing them to anneal by virtue of their own heat, as by leaving them in an insulating mold. As previously discussed, the cooling rate may vary but is usually a reduction in temperature of from about 10° to about 50° C. per hour.

The size of the particles mixed together can be any suitable size within a wide range since, upon fusion, the molten products intimately mix regardless of the size of the starting materials. For efficiency in melting, the particle size of the components is usually between about 0.5 to 1 millimeter or smaller. Desirably, the sizes of the particles of the starting materials for the composition are relatively close to each other so that the components of the composition do not readily separate from each other by settling. In the broad range, the particle sizes may vary from a few microns to a centimeter or higher.

The components of the compositions, prior to fusion, are mixed by any suitable means such as a roll mixer or twin shell mixer.

The following example serves to illustrate and not limit the present invention.

EXAMPLE 1

The mixtures of components as shown in Tables I, II and II were each blended in a twin shell mixer. Three hundred pounds of each of the blends shown in Table I were then introduced into an open arc furnace and heated to from 2,100° to 2,150° C. The arc furnace comprised a water cooled steel pot having a 42 inch diameter and having three vertically disposed graphite electrodes interconnected by horizontal graphite bars proximate the top of the pot. The resulting molten mass near the center of the pot was then poured into an 18"×4"×6" space formed in a bonded graphite mold. The resulting mass was then cooled for about six days.

Each of the resulting fused cast compositions were then tested for corrosion resistance by suspending a ¾ inch square by 4 inch block of the fused cast material in molten "E" glass at 1,482° C. Increments of fresh "E" glass were periodically added. After various periods of time, the corrosion cut into the block at the surface and beneath the surface of the "E" glass was measured. In addition, the stones (the fragments deposited by the block) were measured. The results of the test are shown in Table III.

As can be seen from the test results, the compositions of the invention at comparable chromia concentration have a combined corrosion and stoning resistance in the presence of "E" glass which is superior to other compositions, including the one disclosed in U.S. Pat. No. 3,759,728. As can be seen from Table III, at least one of the corrosion or stoning resistance of the fused cast composition of the invention is better than the compositions outside of the invention having similar $Cr_2O_3$ content, while the remaining stoning or corrosion characteristic of the composition of the invention is comparable to and usually better than the compositions outside of the invention having similar $Cr_2O_3$ content. The days to cut one inch are calculated by extrapolating the actual cut during the test period.

TABLE I

| | COMPONENTS OF MIXTURES TESTED IN FUSED CAST REFRACTORIES | | | | | | |
|---|---|---|---|---|---|---|---|
| Mixture Number | Chromic Oxide | Chrome Ore | Alumina | Magnesia | Silica Sand | Nitrate, Floride and Lithium containing fusion aids | Scrap (material previously made with the same composition) |
| *1. | 80.6 | | 7.9 | 11.7 | 1.0 | 1.5 | |
| 2. | 67.7 | | 27.7 | 1.3 | 1.0 | 2.5 | |

TABLE I-continued

COMPONENTS OF MIXTURES TESTED IN FUSED CAST REFRACTORIES

| Mixture Number | Chromic Oxide | Chrome Ore | Alumina | Magnesia | Silica Sand | Nitrate, Floride and Lithium containing fusion aids | Scrap (material previously made with the same composition) |
| --- | --- | --- | --- | --- | --- | --- | --- |
| 3. | 78.4 | | 17.1 | 1.3 | 1.0 | 2.5 | |
| 4. | 87.0 | | 8.3 | 1.3 | 1.0 | 2.5 | |
| *5. | 87.0 | | 0.6 | 9.3 | 0.8 | 2.5 | |
| 6. | 81.6 | | 13.2 | 1.5 | 1.0 | 2.7 | |
| **7. | 87.0 | | 8.7 | 0 | 1.5 | 2.8 | |
| ***8. | 45.0 | 9.6 | — | 4.0 | 0.3 | 1.1 (No Nitrate) | 40.0 |

*Outside of composition range of the invention. Magnesia too high (greater than about 4%).
**Outside of composition range of the invention. Magnesia too low (less than about 0.75%).
***Outside of composition range of the invention. Magnesia too high (total over 7% including scrap and ore). Generally within the disclosure of U.S. Pat. No. 3,759,728.

TABLE II

CALCULATED COMPOSITIONS IN MIXTURES ASSUMING THE COMPONENT FORMULAS SHOWN

| Mixture Number | $Cr_2O_3$ | $Al_2O_3$ | MgO | $SiO_2$ | $Na_2O$ | F | $Li_2O$ | $TiO_2$ | FeO | CaO |
| --- | --- | --- | --- | --- | --- | --- | --- | --- | --- | --- |
| 1. | 77.6 | 8.1 | 11.1 | 1.9 | — | 0.3 | 0.05 | — | 0.3 | 0.6 |
| 2. | 66.6 | 28.0 | 1.4 | 1.9 | 0.5 | 0.3 | 0.1 | — | 0.7 | 0.4 |
| 3. | 77.2 | 17.5 | 1.5 | 1.9 | 0.3 | 0.3 | 0.1 | — | 0.8 | 0.3 |
| 4. | 85.6 | 8.9 | 1.5 | 1.9 | 0.3 | 0.3 | 0.1 | — | 0.9 | 0.5 |
| 5. | 85.6 | 1.3 | 9.1 | 2.0 | 0.3 | 0.3 | 0.1 | — | 0.9 | 0.4 |
| 6. | 80.0 | 14.0 | 1.7 | 2.0 | 0.4 | 0.5 | 0.1 | — | 0.9 | 0.4 |
| 7. | 85.6 | 9.5 | 0.3 | 2.3 | 0.4 | 0.5 | 0.1 | — | 0.9 | 0.4 |
| 8. | 78.7 | 3.9 | 7.1 | 2.3 | — | 2.6 | 0.05 | 0.1 | 5.1 | 0.2 |

TABLE III

CORROSION RESISTANCE OF CAST REFRACTORIES

| | Run #1 | | | | Run #2 | | | Run #3 | | | Run #4 | | | |
| --- | --- | --- | --- | --- | --- | --- | --- | --- | --- | --- | --- | --- | --- | --- |
| | 1 | 2 | 3 | 4 | 1 | 2 | 3 | 1 | 2 | 3 | 1 | 2 | 3 | 4 |
| MIXTURE | 1. | 1. | 6. | 7. | 2. | 3. | 1. | 3. | 5. | 6. | 1. | 8. | 2. | 6. |
| Test Duration | | 15 days | | | | 14 days | | | 25 days | | | 27 days | | |
| Days to Cut One Inch Melt Line | 250 | 326 | 1500 | 211 | 438 | 350 | 250 | 198 | 205 | 352 | 257 | 233 | 284 | 284 |
| 1" Below Melt Line | 278 | — | — | 227 | 467 | 378 | 237 | 368 | 312 | 446 | 435 | 643 | 415 | 563 |
| Stone Count | 5 | 30 | 4 | 237 | 0 | 0 | 0 | 7 | 19 | 8 | 6 | 9 | 2 | 2 |
| Comments | | Down Once During Test Near End | | | | | | | Down After 14 Days. Back up for 11 Days | | | | | |

What is claimed is:

1. A fused ceramic composition consisting essentially of a solidified fusion of from about 65 to about 98 weight percent $Cr_2O_3$, from about 0.75 to about 4 weight percent MgO, from about 1 to about 34.25 weight percent alumina, and less than about 2 weight percent iron oxide.

2. The fused ceramic composition of claim 1 consisting essentially of a solidified fusion of from about 68 to about 90 weight percent $Cr_2O_3$, from about 0.75 to about 2.5 weight percent MgO and from about 9 to about 31.25 weight percent alumina.

3. A method for the manufacture of a fused ceramic composition which comprises fusing a mixture consisting essentially of from about 65 to about 98 weight percent $Cr_2O_3$, from about 0.75 to about 4 weight percent MgO, from about 1 to about 34.25 weight percent alumina and less than about 2 weight percent iron oxide in a furnace followed by slowly cooling the resulting composition.

4. The method of claim 3 wherein from about 68 to about 90 weight percent $Cr_2O_3$, from about 0.75 to about 2.5 weight percent MgO and from about 9 to about 31.25 weight percent alumina are fused in said furnace.

5. The method of claim 3 wherein the furnace is an open top arc furnace.

6. The method of claim 3 wherein after fusing, the composition is slowly cooled at a rate of from about 10° to about 50° C. per hour.

7. The fused ceramic composition of claim 1 wherein the fusion contains from about 1 to about 4 weight percent of fusion aids.

8. The method of claim 3 wherein the fusion contains from about 1 to about 4 weight percent fusion aids.

9. The fused ceramic composition of claim 2, further consisting of up to about 0.9 weight percent FeO and less than about 1.0 weight percent CaO.

* * * * *